US012609217B2

(12) United States Patent
Mansir et al.

(10) Patent No.: US 12,609,217 B2
(45) Date of Patent: Apr. 21, 2026

(54) SUPERCONDUCTING CABLES FOR ELECTRICAL SUBMERSIBLE PUMP MOTORS

(71) Applicant: Halliburton Energy Services, Inc., Houston, TX (US)

(72) Inventors: Hassan Mansir, Frimley (GB); Robert Charles De Long, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 3 days.

(21) Appl. No.: 18/535,374

(22) Filed: Dec. 11, 2023

(65) Prior Publication Data

US 2025/0191816 A1      Jun. 12, 2025

(51) Int. Cl.
| | |
|---|---|
| *H01B 12/16* | (2006.01) |
| *E21B 17/00* | (2006.01) |
| *E21B 36/00* | (2006.01) |
| *E21B 43/12* | (2006.01) |
| *H01B 12/02* | (2006.01) |
| *H02K 5/132* | (2006.01) |

(52) U.S. Cl.
CPC ........... *H01B 12/16* (2013.01); *E21B 17/003* (2013.01); *E21B 36/001* (2013.01); *E21B 43/128* (2013.01); *H01B 12/02* (2013.01); *H02K 5/132* (2013.01)

(58) Field of Classification Search
CPC ...... E21B 36/04; E21B 43/2401; E21B 43/24; E21B 43/243; E21B 36/001; E21B 43/12; E21B 17/00; E21B 17/003
See application file for complete search history.

(56) References Cited

U.S. PATENT DOCUMENTS

| | | |
|---|---|---|
| 2002/0134533 A1 | 9/2002 | Bechis et al. |
| 2008/0185184 A1 | 8/2008 | Maguire |
| 2011/0275521 A1 | 11/2011 | Stemmle et al. |
| 2014/0131044 A1 | 5/2014 | Parsche |
| 2014/0221213 A1 | 8/2014 | Fukuda |
| 2022/0359104 A1 | 11/2022 | Willén et al. |
| 2023/0132937 A1 | 5/2023 | Finke et al. |

FOREIGN PATENT DOCUMENTS

| | | | |
|---|---|---|---|
| AU | 2010256522 A1 * | 2/2012 | ............. H04B 13/02 |
| EP | 3115997 | 1/2017 | |

(Continued)

OTHER PUBLICATIONS

"PCT Application No. PCT/US2023/083464 International Search Report and Written Opinion", Aug. 30, 2024, 10 pages.

(Continued)

*Primary Examiner* — Zakiya W Bates
(74) *Attorney, Agent, or Firm* — DeLizio, Peacock, Lewin and Guerra, LLP

(57) ABSTRACT

A cable structure for use in a wellbore formed in a subsurface formation. The cable structure comprises superconducting material configured to provide power to a downhole tool in the wellbore. The cable structure comprises a cryogenic liquid supply channel configured to supply fluid to reduce temperature of the superconducting material. The cable structure comprises one or more cryogenic liquid return channels.

18 Claims, 8 Drawing Sheets

(56) References Cited

FOREIGN PATENT DOCUMENTS

| | | |
|---|---|---|
| KR | 20190010028 | 1/2019 |
| WO | 2005124213 | 12/2005 |

OTHER PUBLICATIONS

Paramane, et al., "A Review on Insulation and Dielectrics for High-Temperature Superconducting Cables for Power Distribution: Progress, Challenges, and Prospects", IEEE Transactions on Applied Superconductivity, vol. 33, No. 6, Sep. 2023, Sep. 2023, 31 pages.
"PCT Application No. PCT/US2024/054615 International Search Report and Written Opinion", Mar. 20, 2025, 10 pages.

* cited by examiner

700

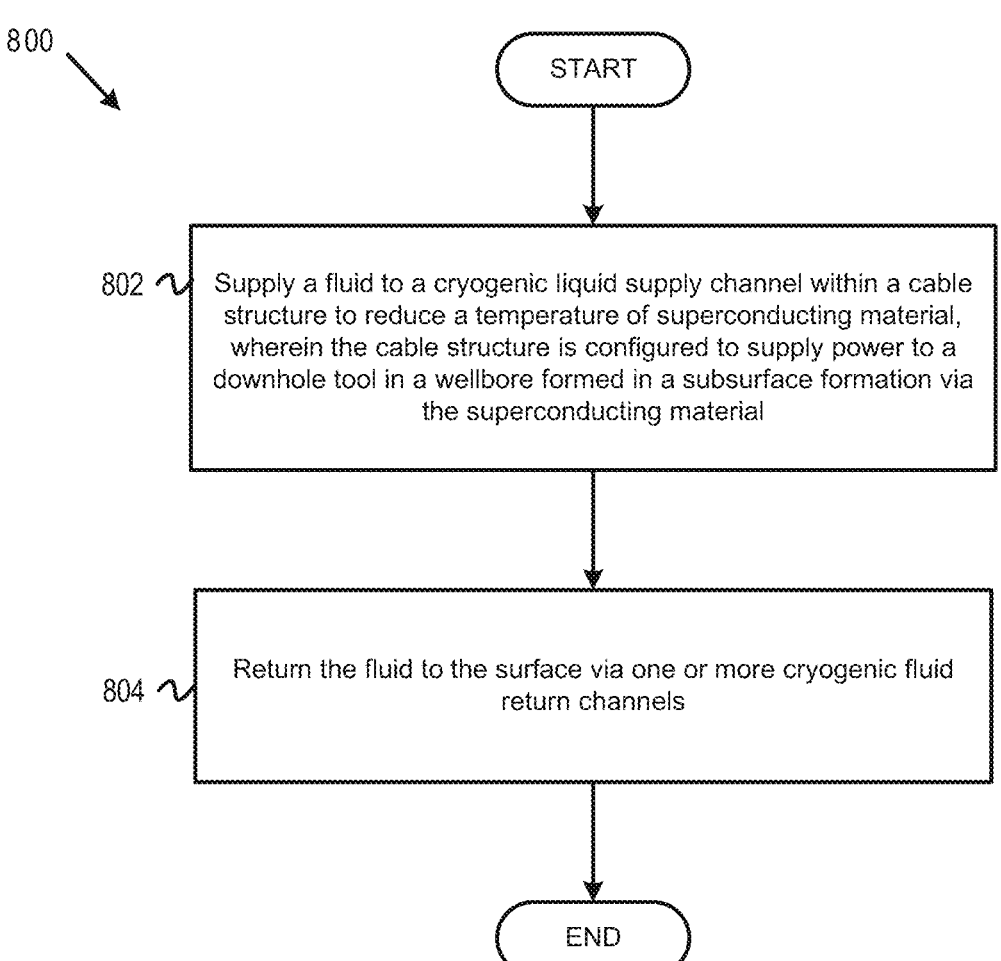

800

START

802 — Supply a fluid to a cryogenic liquid supply channel within a cable structure to reduce a temperature of superconducting material, wherein the cable structure is configured to supply power to a downhole tool in a wellbore formed in a subsurface formation via the superconducting material 804 — Return the fluid to the surface via one or more cryogenic fluid return channels

END

SUPERCONDUCTING CABLES FOR ELECTRICAL SUBMERSIBLE PUMP MOTORS

FIELD

Some implementations relate generally to the field of electrical submersible pumps positioned in a wellbore and more particularly to the field of superconducting cables for electrical submersible pumps.

BACKGROUND

In hydrocarbon recovery operations from a wellbore, an electrical submersible pump (ESP) may be utilized to transport the hydrocarbons to the surface. Power is supplied to the motor of the ESP from a power source on the surface via a cable. The motor may be sized such that the ESP outputs a specified flow rate of fluid to the surface.

BRIEF DESCRIPTION OF THE DRAWINGS

Implementation of the disclosure may be better understood by referencing the accompanying drawings.

FIG. 8 is a flowchart of example operations for supplying power to a downhole tool via one or more superconducting cables, according to some implementations.

DESCRIPTION

Figure 1:
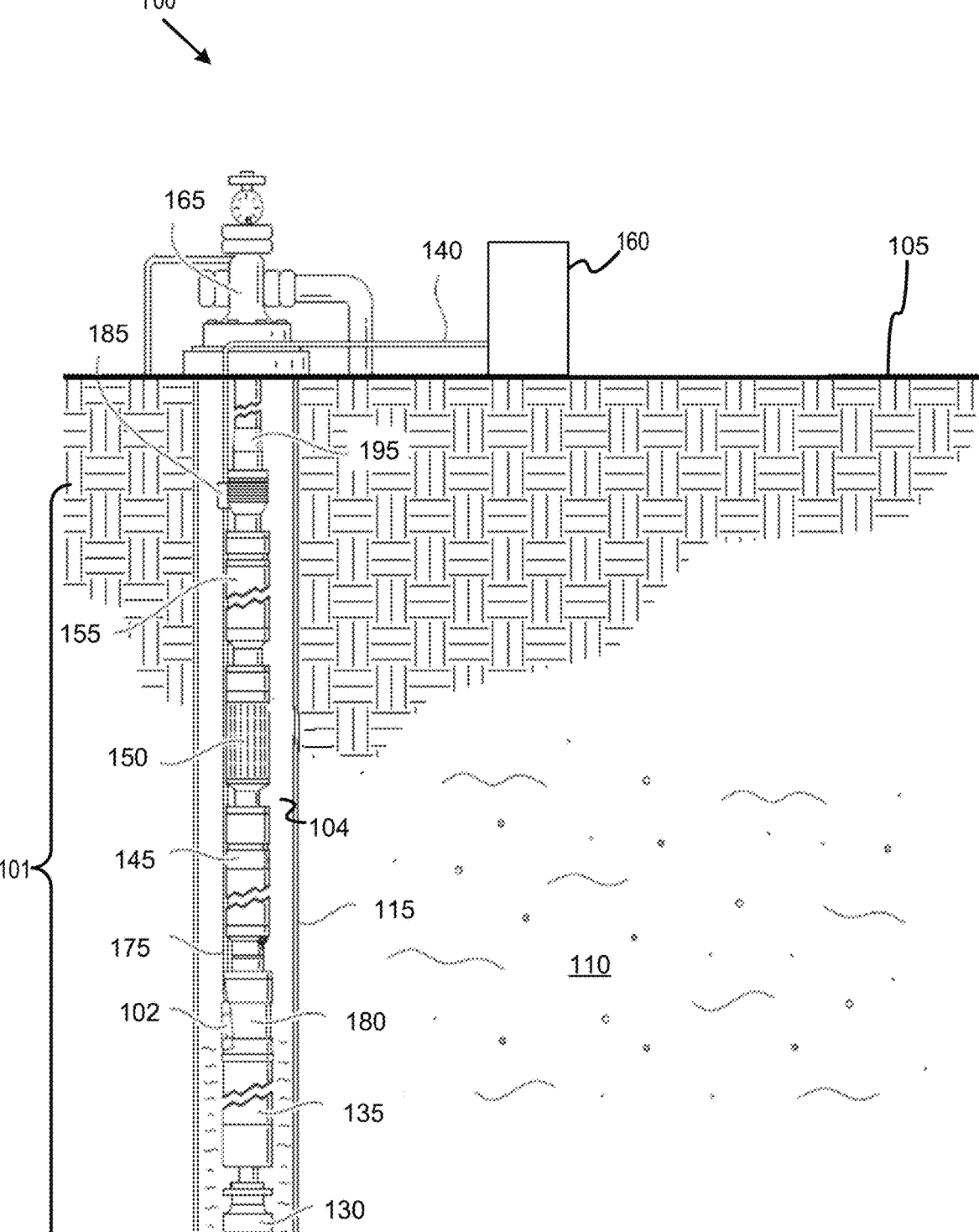
FIG. 1 depicts an example well system with an electrical submersible pump (ESP), according to some implementations.

The description that follows includes example systems, methods, techniques, and program flows that embody aspects of the disclosure. However, it is understood that this disclosure may be practiced without these specific details. For instance, this disclosure refers to superconducting cables to provide power to an electrical submersible pump in a wellbore formed in a subsurface formation. Aspects of this disclosure can also be applied to other downhole tools that require power from the surface. For clarity, some well-known instruction instances, protocols, structures, and techniques have been omitted.

Example implementations relate to a cable structure that includes superconducting materials configured to provide power to a downhole tool. In some implementations, high-temperature superconducting (HTS) cables offer high-power density power transmission solution as they have the ability to carry larger amount of electrical current within a smaller physical size compared to conventional cables (such as copper cables). This characteristic may be particularly advantageous in oil and gas operations, where compact solutions are required.

In electrical submersible pumps (ESPs), increased power of the motors may be desired. For instance, a larger motor may be able to pump larger volumes of fluid, resulting in an increase in hydrocarbon recovery. As a result, there may be a need to reduce the size of the cable to maximize the diameter of the motor and/or reduce the motor length. The voltage rating of the motor may be increased in order to reduce its rated current. However, increasing the voltage rating (such as above 5 kilovolts (kV)) may be challenging due to the available space within the motor. Maintaining electrical insulation and reducing partial discharge (PD) may require the use of stress grading and semiconductor layers. However, these are bulky, have limited temperature capability, and the space to accommodate them in a motor may not be readily available. In some implementations, power consumption may be the single largest cost when operating an ESP in a wellbore. Power loss due to electrical inefficiency may be a large contributor to the aforementioned cost of operation. In some implementation, reducing the electrical losses may contribute in a significant way to lowering operational cost and contributing to a reduction in the carbon footprint.

To solve the challenge, the solutions may be to maintain motor voltage within levels of standard insulation systems and use appropriate cables for carrying the currents within the available space. Superconducting cables may provide that solution. With their power density, current handling capacity and near zero losses, large amount of power may be transferred to the motor from surface at conductor cross section that are a fraction of the copper or aluminum equivalent.

In some implementations, a cable structure may include a superconducting material configured to provide power to a downhole tool, such as an ESP. The superconducting materials may include bismuth strontium calcium copper oxide (BSCCO) with a critical temperature of approximately 113 degrees Kelvin (K), yttrium barium copper oxide (YBCO) with a critical temperature of approximately 93 degrees K, etc. In some implementations, the superconducting material may be cooled (such as with a fluid), resulting in the superconducting material reaching the critical temperature for superconductivity to take effect. The cable structure may include one or more cryogenic liquid supply channels. The cryogenic liquid supply channels may supply fluid (such as liquid nitrogen, liquid helium, etc.) to the cable from the surface to reduce the temperature of the superconducting material. The cable structure may also include one or more cryogenic liquid return channels that may allow the fluid to return to the surface after it has flowed through the cryogenic liquid supply channels. In some implementations, the fluid may not return to the surface. For example, the fluid may flow to the motor to be utilized for motor cooling. The cable structure may include one or more quench conductors that may provide redundancy to the cable structure. For example, if a cryogenic liquid supply and/or return channel were to fail, the conductivity of the superconducting material may be reduced, resulting in overheating of the cable structure and ultimately damage to one or more components in the cable structure. Accordingly, a quench conductor may be utilized as a backup conductor for the cable structure to avoid damage to the cable structure.

The cable structure with superconducting material may include structures such as a round conductor cable, twisted conductor cable, layered conductor cable, coaxial cable, etc. The round conductor cable may include a superconducting wire or filament surrounded by a metallic or non-metallic sheath, typically made of copper or stainless steel. This structure may provide mechanical strength and may allow for efficient cooling and thermal management. Twisted conductor cables may be constructed by twisting multiple superconducting wires or filaments together. This structure may enhance the flexibility and mechanical strength of the cable, making it suitable for applications that may require high flexibility. Additionally, twisted conductor cables may offer improved stability against electromagnetic disturbances and may provide redundancy, as the failure of one wire does not result in the complete loss of superconductivity. Layered conductor cables may include multiple layers of superconducting and non-superconducting materials stacked to form the cable structure. This may allow for a higher current-carrying capacity (relative to standard conductors such as a copper cable) by distributing the current over a larger cross-sectional area. Coaxial cables may include a central superconducting core surrounded by one or more layers of insulation and a metallic outer sheath. This structure may provide electromagnetic shielding which may minimize interference from external electromagnetic fields.

In some implementations, cable structures with superconducting material may be bundled together to make a multi-phase cable required for ESP applications. Configurations of a bundled three conductor cable will be disclosed herein. The cables may be packaged in conduits that may serve as both the structural support and for cooling the superconducting material. The conduit sizing may allow for efficient cooling using cryogenic liquids, such as liquid helium or liquid nitrogen. In some implementations, the application of the cable structure may allow for ESP systems to achieve redundancy in critical applications such as deep water wellbores.

In some implementations, the cable structure with superconducting material may be utilized in other applications other than artificial lift (such as ESPs). For example, the cable structure may be applicable to other activities and/or downhole tools such as electric drive downhole motors for drilling operations, electric or electronic drill head bottom hole assemblies, electronic measuring tools, completion operations, etc. The cable structure with superconducting material may be utilized in operations outside of oil and gas operations. For example, the cable structure may be utilized in ESP geothermal recovery operations, water source wells, dewatering applications.

Example Systems

FIG. 1 depicts an example well system with an electrical submersible pump (ESP), according to some implementations. While well system 100 illustrates a land-based subterranean environment, the present disclosure contemplates any well site environment including a subsea environment. In one or more embodiments, any one or more components or elements may be used with subterranean operations equipment located on offshore platforms, drill ships, semi-submersibles, drilling barges and land-based rigs.

An ESP assembly 101 is located downhole in a wellbore 104 below a surface 105. The wellbore 104 may, for example, be several hundred or a few thousand meters deep. The wellbore 104 is depicted as vertical, but it may also be horizontal or may be curved, bent and/or angled, depending on the wellbore direction. The wellbore 104 may be an oil well, water well, and/or well containing other hydrocarbons, such as natural gas, and/or another production fluid taken from a subsurface formation 110. The ESP assembly 101 may be separated from the subsurface formation 110 by a well casing 115. Production fluid enters the well casing 115 through casing perforations (not shown). Casing perforations may be either above or below an ESP intake 150. The ESP assembly 101 includes, from bottom to top, a downhole gauge 130 which may include one or more sensors that may detect and provide information such as motor speed, internal motor temperature, pump discharge pressure, downhole flow rate and/or other operating conditions to a user interface, variable speed drive controller, and/or data collection computer, herein individually or collectively referred to as controller 160, on surface 105. An ESP motor 135 may comprise an induction motor, such as a two-pole, three phase squirrel cage induction motor, a direct current (DC) motor, and a permanent magnet motor. An ESP cable 140 may be communicatively coupled to the controller 160. The ESP cable 140 may provide power to the ESP motor 135 and/or carries data to and/or from the downhole gauge 130 to the surface 105. A pothead 102 encloses the electrical connection between ESP cable 140 and a head 180 of the ESP motor 135.

In conventional ESP applications, the ESP cable 140 may extend from the controller 160 at surface 105 to a motor lead extension (MLE) 175. A cable connection 185 connects the ESP cable 140 to the MLE 175. The MLE 175 may plug in, tape in, spline in or otherwise electrically connect the ESP cable 140 to the ESP motor 135 to provide power to the ESP motor 135.

The ESP cable 140 may include a cable structure comprising superconductor material, cryogenic fluid supply channels, and cryogenic fluid return channels. In some implementations, the well system 100 may not include an MLE 175, and the ESP cable 140 may be directly electrically connected to the pothead 102. This may assist in avoiding the need to splice the superconductor cables on top of the motor. Splicing superconductor cables may be a complex procedure as it may involve both power cables and cooling channels and any other conductors in the bundle of the ESP cable 140. The well system 100 may include components (not pictured) on and/or near the surface 105 to store, pump, cool, etc. the cryogenic fluid that may be supplied to the cryogenic fluid supply channels for the superconducting cable and receive the cryogenic fluid from the cryogenic fluid return channels.

Upstream of the ESP motor 135 is a motor protector 145, an ESP intake 150, an ESP pump 155 and a production tubing 195. The motor protector 145 may serve to equalize pressure and keep the motor oil separate from well fluid. The ESP intake 150 may include intake ports and/or a slotted screen and may serve as the intake to the ESP pump 155. The ESP pump 155 may comprise a multi-stage centrifugal pump including stacked impeller and diffuser stages. Other components of ESP assemblies may also be included in the ESP assembly 101, such as a tandem charge pump (not shown) or gas separator (not shown) located between the ESP pump 155 and the ESP intake 150 and/or a gas separator that may serve as the pump intake. Shafts of the ESP motor 135, the motor protector 145, the ESP intake 150 and the ESP pump 155 may be connected (i.e., splined) and rotated by the ESP motor 135. The production tubing 195 may carry lifted fluid from the discharge of the ESP pump 155 toward a wellhead 165.

Example Superconducting Cable Structures

Examples of a superconducting cable structures are now described. The superconducting cables of superconducting cable structure is described in reference to the ESP cable 140 of FIG. 1. The superconducting cables structures are described herein with multiple superconducting cables configured in various structures (i.e., 3 superconducting cables configured in a flat structure, triangular structure, etc.) with respective superconducting material. The structures are not limited to flat and triangular, but may also be configured in any other suitable structure such as round, twisted, layered, coaxial, etc. The superconducting cable structures are not limited to 3-phase, but may include one superconducting cable and/or more than superconducting cable (e.g., multiple cryogenic fluid supply channels, cryogenic fluid return channels, etc.). For example, the structure may include 2 superconducting cables to accommodate a DC motor of an ESP. The insulators described herein may be any suitable material to provide thermal and/or electrical insulation for the components within the superconducting cable structures.

Figure 2A:
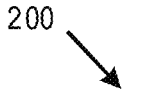
FIGS. 2A-2B are schematics of example superconducting cable structures, according to some implementations.
Figure 2A:
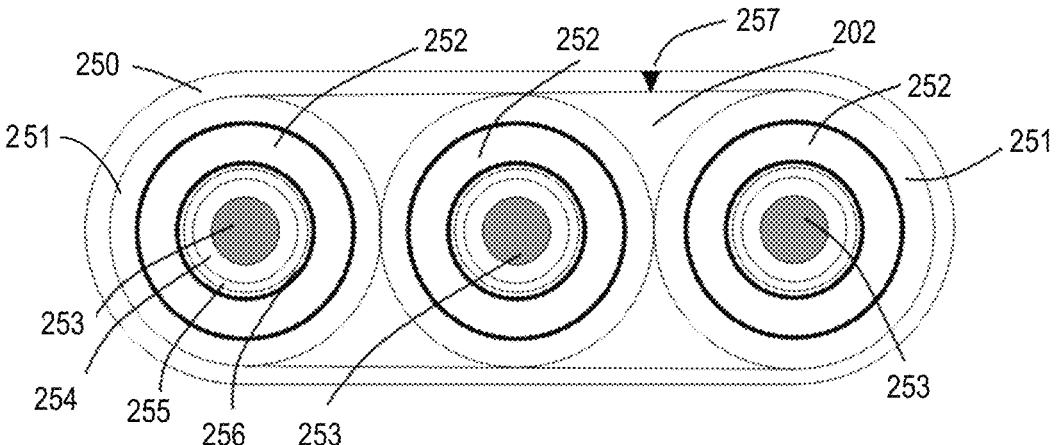
Figure 2B:
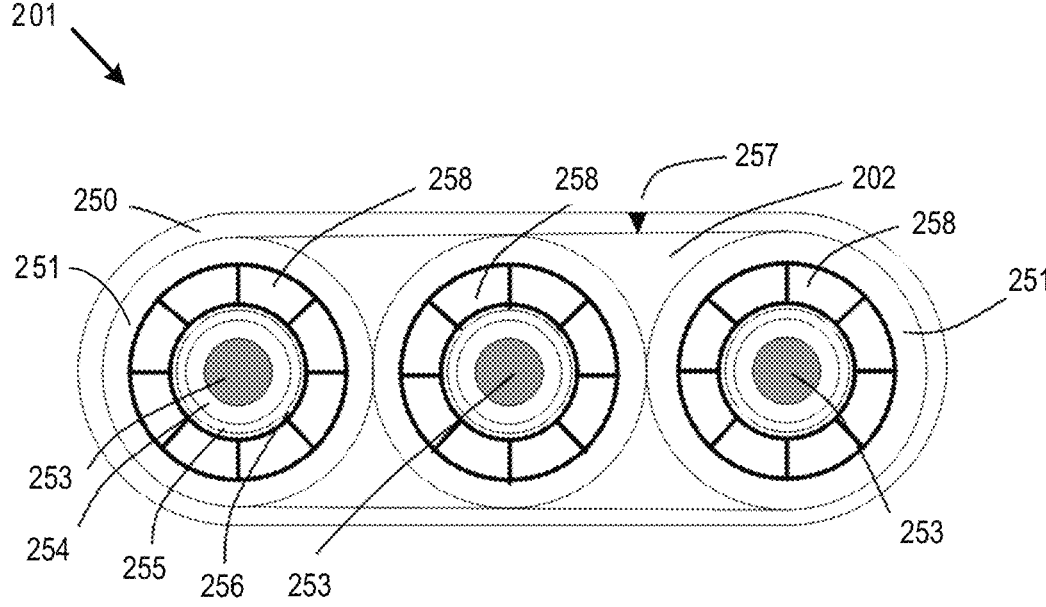

FIGS. 2A-2B are schematics of example superconducting cable structures, according to some implementations. In particular, FIG. 2A includes a cross-sectional view of a flat superconducting cable structure 200. The flat superconducting cable structure 200 may be coupled to components of a downhole tool positioned in a wellbore (such as pothead 102 to supply power to the ESP motor 135 of the ESP assembly 101 of FIG. 1). The flat superconducting cable structure 200 depicts a flat cable structure that consists of three quench conductors 253. The quench conductor 253 may use any suitable conductive material such as copper. In some implementations, the quench conductors may provide redundancy, as the superconducting material 255 (described below) may act as the main power supplier to the downhole tool and the quench conductors 253 may act as a secondary conductor if the cooling system within the superconducting cables may fail. Each quench conductor 253 may be encased with an electrical insulator 254 comprising materials such as a polymer, elastomer, or any other suitable electrical insulating material. Each of the electrical insulators 254 may be encased with a superconducting material 255. The superconducting material 255 may include materials such as bismuth strontium calcium copper oxide (BSCCO) with a critical temperature of approximately 113 degrees Kelvin (K), yttrium barium copper oxide (YBCO) with a critical temperature of approximately 93 degrees K, etc. Each superconducting material may be encased with an insulator 256.

To reduce the temperature of the superconducting material 255 (i.e., to reduce the superconducting material 255 to a respective critical temperature), a cryogenic fluid supply channel 252 may encase each insulator 256. The cryogenic fluid supply channel 252 may be configured to supply fluid such as liquid helium, liquid nitrogen, etc. to the flat superconducting cable structure 200. A thermal insulator 251 may encase each cryogenic fluid supply channel 252. The thermal insulator 251 may include materials such as a polymeric compound that may protect each superconducting cable from wellbore fluid ingress by a lead tubing or any other suitable material. In some implementations, due to the cryogenic environment, the thermal insulators may be applied via methods such as a lapped tape technique and include materials such as polypropylene laminated paper (PPLP). In some implementations, heat shrink polyethene terephthalate (PET) tubing, coating, etc. may also be utilized when conductor tapes, strands, etc. of the conductors are individually insulated.

The superconducting cables (the quench conductors 253, superconducting material 255, cryogenic fluid supply channel 252, and insulators) may be wrapped in an armor 250. The armor 250 may be made by rolling and shaping a flat stainless sheet and welding the seam 257. The material of the armor 250 may include Inconel, Monel, etc. The sheet may be welded utilizing any suitable welding method such as welding methods with minimum heat injection including laser welding, electron-beam (EB) welding, etc. This operation may be performed after superconducting cables are inserted inside the conduit. In the implementation depicted in FIG. 2A, the areas between the conducting cable structures and the armor 250 (i.e., between the armor 250 and the thermal insulator 251) may act as a cryogenic fluid return channel 202, where the fluid may return to the surface. In some implementations, the cryogenic fluid return channel 202 may be pressurized. For example, the cryogenic fluid return channel 202 may be pressurized to a pressure equal to or greater than the pressure external to the armor 250 (such as in the wellbore) to prevent the armor 250 from collapsing, leakage from wellbore fluid into the cryogenic fluid return channel 202, etc.

FIG. 2B includes a cross-sectional view of a flat superconducting cable structure 201. The flat superconducting cable structure 201 may include similar components as the flat superconducting cable structure 200 of FIG. 2A. For example, the flat superconducting cable structure 201 includes a flat cable structure that consists of three quench conductors 253. Each quench conductor 253 may be encased with an electrical insulator 254. Each of the electrical insulators 254 may be encased with a superconducting material 255. Each superconducting material 255 may be encased with an insulator 256. A cryogenic fluid supply channel 258 may encase the insulator 256. In some implementations, the cryogenic fluid supply channel 258 may include a honeycomb structure that may provide strength and/or to improve colling performance. In the implementation depicted in FIG. 2B, the honeycomb structure of the cryogenic fluid supply channel 258 is depicted with 8 chambers. The cryogenic fluid supply channel 258 may include more or less than 8 chambers such as 2 chambers, 16 chambers, etc. In some implementations, the cryogenic fluid supply channels 258 within the flat superconducting cable structure 201 may include the same or a different number of chambers. For example, a cryogenic fluid supply channels 258 may include 4 chambers, and another cryogenic fluid supply channels 258 withing the flat superconducting cable structure 201 may include 8 chambers. The cross sectional areas of the chambers within a cryogenic fluid supply channels 258 may be uniform or different. The cryogenic fluid supply channels 258 may be encased with a thermal insulator 251. The superconducting cables may be wrapped in an armor 250 to form the flat superconducting cable structure 201. The armor 250 may be made by rolling and shaping a flat stainless sheet and welding the seam 257. Areas between the conducting cable structures and the armor 250 (i.e., between the armor 250 and the thermal insulator 251) may act as a cryogenic fluid return channel 202, where the fluid may return to the surface.

Figure 3A:
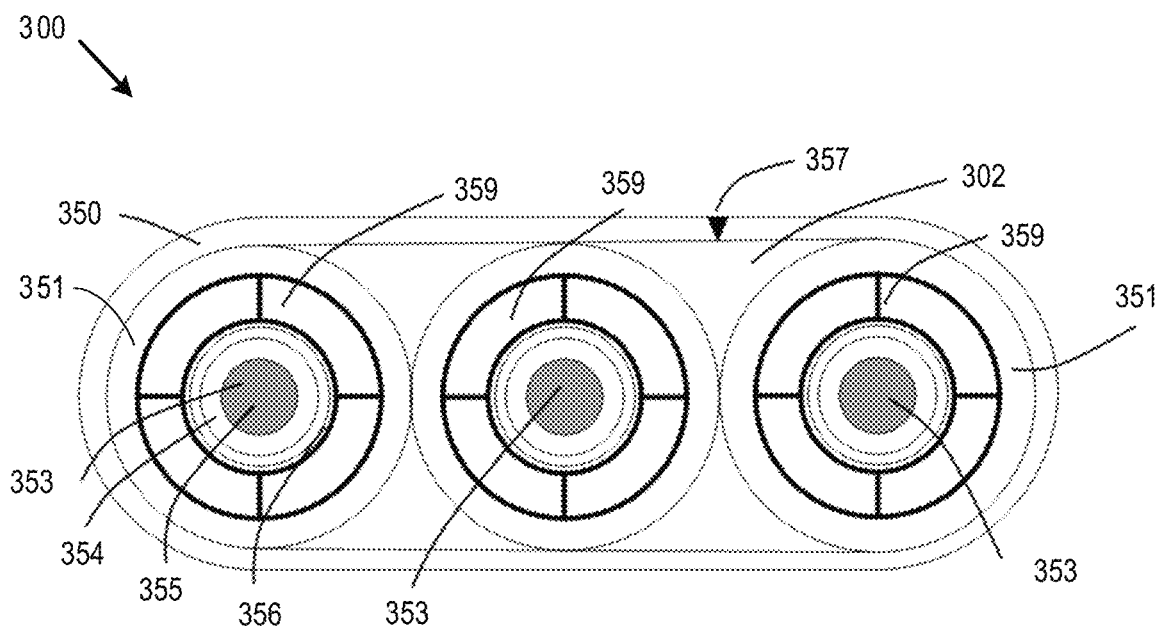
FIGS. 3A-3B are schematics of example superconducting cable structures, according to some implementations.
Figure 3B:
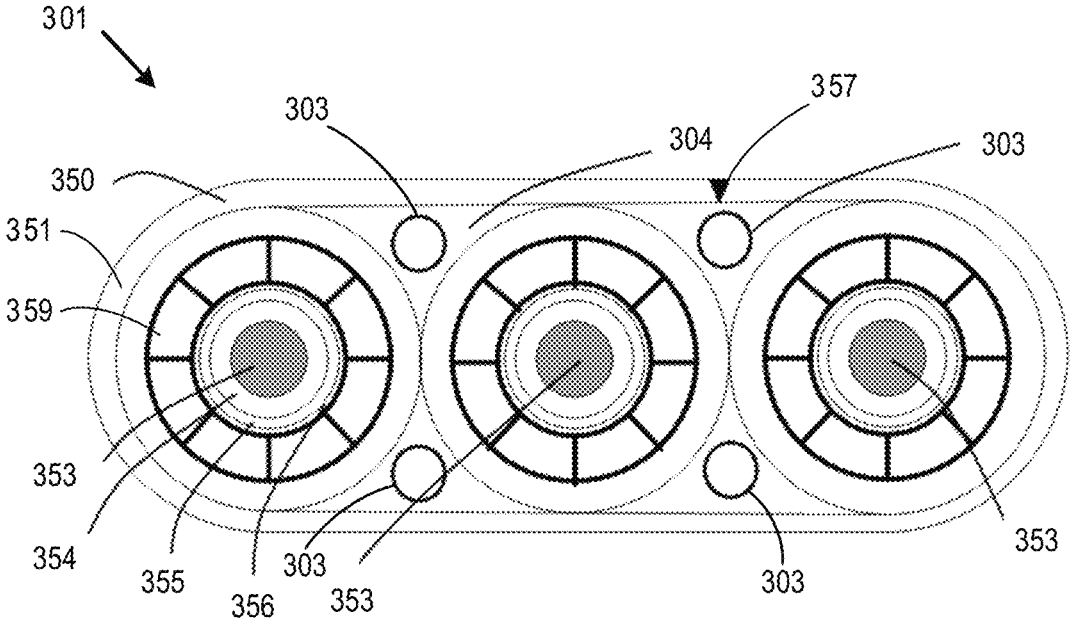

FIGS. 3A-3B are schematics of example superconducting cable structures, according to some implementations. In particular, FIG. 3A includes a cross-sectional view of a flat superconducting cable structure 300. The flat superconducting cable structure 300 includes similar components as the superconducting cable structures described in FIGS. 2A-2B. For example, the flat superconducting cable structure 300 includes a flat cable structure that consists of three quench conductors 353. Each quench conductor 353 may be encased with an electrical insulator 354. Each of the electrical insulators 354 may be encased with a superconducting material 355. Each superconducting material 355 may be encased with an insulator 356. A cryogenic fluid supply channel 359 may encase the insulator 356. In some implementations, the cryogenic fluid supply channel 359 may include a honeycomb structure that may provide strength and/or to improve colling performance. In the implementation depicted in FIG. 3A, the honeycomb structure of the cryogenic fluid supply channel 359 is depicted with 4 chambers. The cryogenic fluid supply channels 359 may be encased with a thermal insulator 351. The conducting cable structures may be wrapped in an armor 350 to form the flat superconducting cable structure 300. The armor 350 may be made by rolling and shaping a flat stainless sheet and welding the seam 357, where the seam 357 of the armor may be welded via welding methods such as laser welding. Areas between the superconducting cables and the armor 350 (i.e., between the armor 350 and the thermal insulator 351) may act as a cryogenic fluid return channel 302, where the fluid may return to the surface.

FIG. 3B includes a cross-sectional view of a flat super-conducting cable structure 301. The flat superconducting cable structure 301 includes similar components as the superconducting cable structures described in FIGS. 2A-2B. For example, the flat superconducting cable structure 301 includes a flat cable structure that consists of three quench conductors 353. Each quench conductor 353 may be encased with an electrical insulator 354. Each of the electrical insulators 354 may be encased with a superconducting material 355. Each superconducting material 355 may be encased with an insulator 356. A cryogenic fluid supply channel 359 may encase the insulator 356. The cryogenic fluid supply channel 359 may include a honeycomb structure that may provide strength and/or to improve colling perfor-mance. In the implementation depicted in FIG. 3B, the honeycomb structure of the cryogenic fluid supply channel 359 is depicted with 8 chambers. The cryogenic fluid supply channels 359 may be encased with a thermal insulator 351. The superconducting cables may be wrapped in an armor 350 to form the flat superconducting cable structure 301. The armor 350 may be made by rolling and shaping a flat stainless sheet and welding the seam 357, where the seam 357 of the armor may be welded via welding methods such as laser welding. In the implementation depicted in FIG. 3B, tubes 303 may be positioned in the area between the armor 350 and the superconducting cables (i.e., between the armor 350 and the thermal insulator 351). The tubes 303 may act as the cryogenic fluid return channels (such as cryogenic fluid return channels 302 of FIG. 3A). The tubes 303 may be embedded in a thermal insulator 304 that may occupy the area between the armor 350 and the thermal insulator 351 and tubes 303. The thermal insulator 304 may include ceramic materials such as magnesium oxide (MgO2), elas-tomer, polymer. In some implementations, the thermal insu-lator 304 may be configured with any suitable material to withstand pressure (i.e., provide mechanical strength) such that the pressure of the environment external to the flat superconducting cable structure 301 does not collapse the armor 350 and/or damage any other internal components of the flat superconducting cable structure 301. In some imple-mentations, the thermal insulator 304 may be replaced with a pressurized fluid to hydraulically balance the flat super-conducting cable structure 301 with the external environ-ment. In some implementations, the use of the thermal insulator 304 may ensure efficient cooling and return of the cryogenic fluid through the cryogenic fluid supply channels and cryogenic fluid return channels, respectively.

Figure 4A:
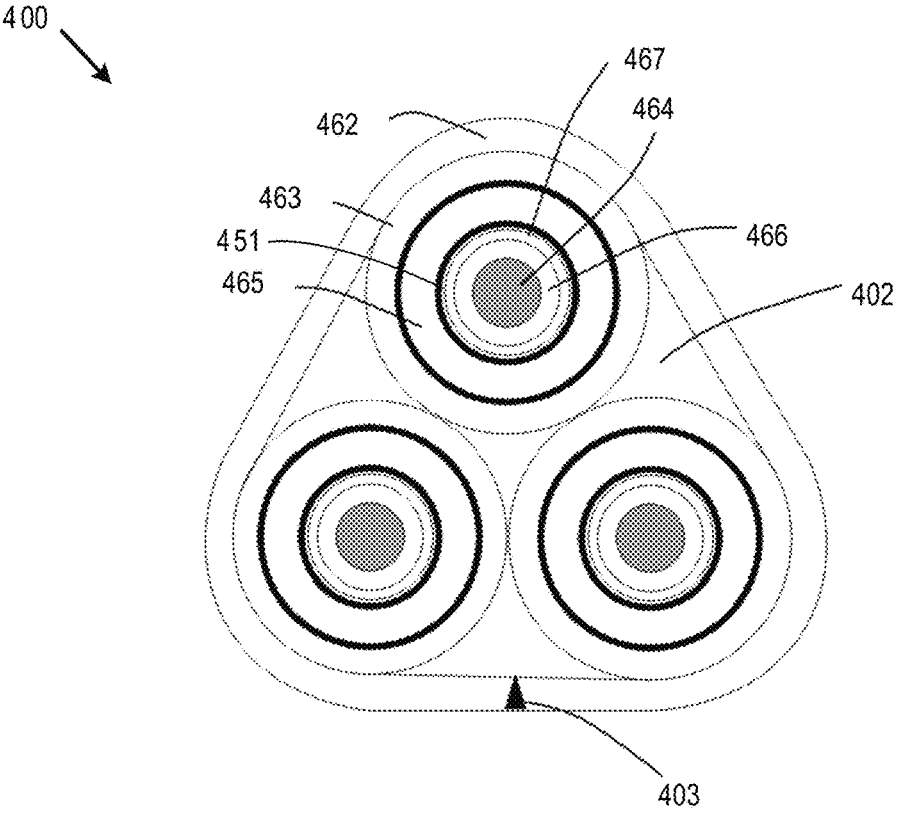
FIGS. 4A-4B are schematics of example superconducting cable structures, according to some implementations.
Figure 4B:
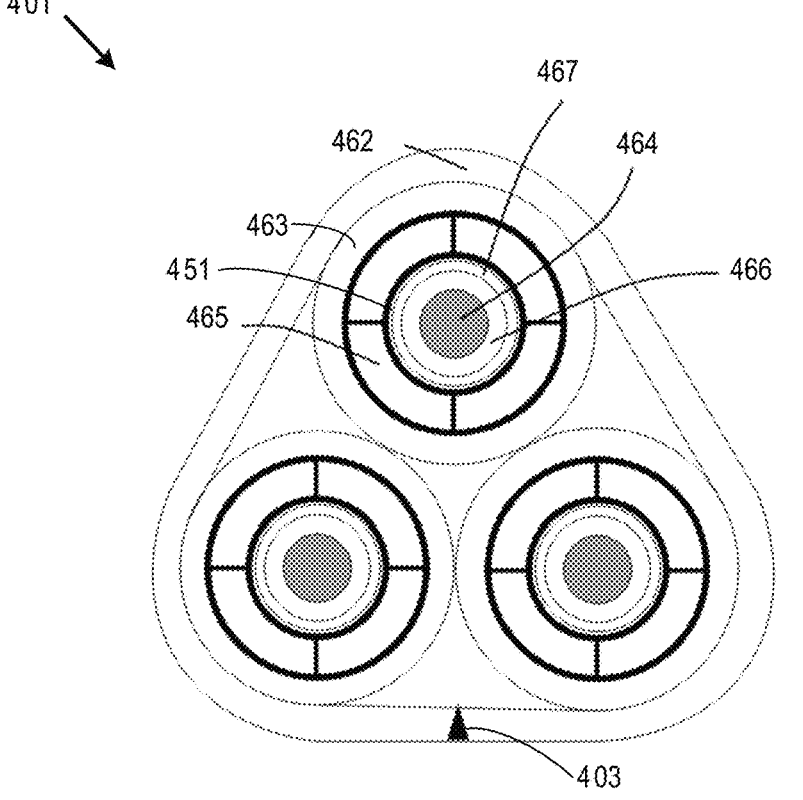

FIGS. 4A-4B are schematics of example superconducting cable structures, according to some implementations. In particular, FIG. 4A includes a cross-sectional view of a triangular superconducting cable structure 400 with three superconducting cables positioned in a triangular arrange-ment, where the centers of the superconducting cables may be positioned at the corners of the triangle. The triangular superconducting cable structure 400 includes similar com-ponents as the superconducting cable structures described in FIGS. 2A-2B and FIGS. 3A-3B. For example, the triangular superconducting cable structure 400 includes a triangular structure that consists of three quench conductors 454. Each quench conductor 454 may be encased with an electrical insulator 466. Each of the electrical insulators 466 may be encased with a superconducting material 467. Each super-conducting material 467 may be encased with an insulator 451. A cryogenic fluid supply channel 465 may encase the insulator 451. A thermal insulator 463 may encase the cryogenic fluid supply channel 465. The conducting cable structures may be wrapped in an armor 462. The armor 462 may be made by rolling and shaping a flat stainless sheet and welding the seam 403, where the seam 403 of the armor may be welded via welding methods such as laser welding. Areas between the conducting cables and the armor 462 (i.e., between the armor 462 and the thermal insulator 463) may act as a cryogenic fluid return channel 402, where the fluid may return to the surface.

FIG. 4B includes a cross-sectional view of a triangular superconducting cable structure 401 with three supercon-ducting cables positioned in a triangular arrangement. The triangular superconducting cable structure 401 includes similar components as the superconducting cable structures described in FIGS. 2A-2B and FIGS. 3A-3B. For example, the triangular superconducting cable structure 401 includes a triangular structure that consists of three quench conduc-tors 454. Each quench conductor 454 may be encased with an electrical insulator 466. Each of the electrical insulators 466 may be encased with a superconducting material 467. Each superconducting material 467 may be encased with an insulator 451. A cryogenic fluid supply channel 465 may encase the insulator 451. The cryogenic fluid supply channel 465 may include a honeycomb structure that may provide strength and/or to improve colling performance. In the implementation depicted in FIG. 4B, the honeycomb struc-ture of the cryogenic fluid supply channel 465 is depicted with 4 chambers. A thermal insulator 463 may encase the cryogenic fluid supply channel 465. The conducting cables may be wrapped in an armor 462. The armor 462 may be made by rolling and shaping a flat stainless sheet and welding the seam 403, where the seam 403 of the armor may be welded via welding methods such as laser welding. Areas between the conducting cable structures and the armor 462 (i.e., between the armor 462 and the thermal insulator 463) may act as a cryogenic fluid return channel 402, where the fluid may return to the surface.

Figure 5A:
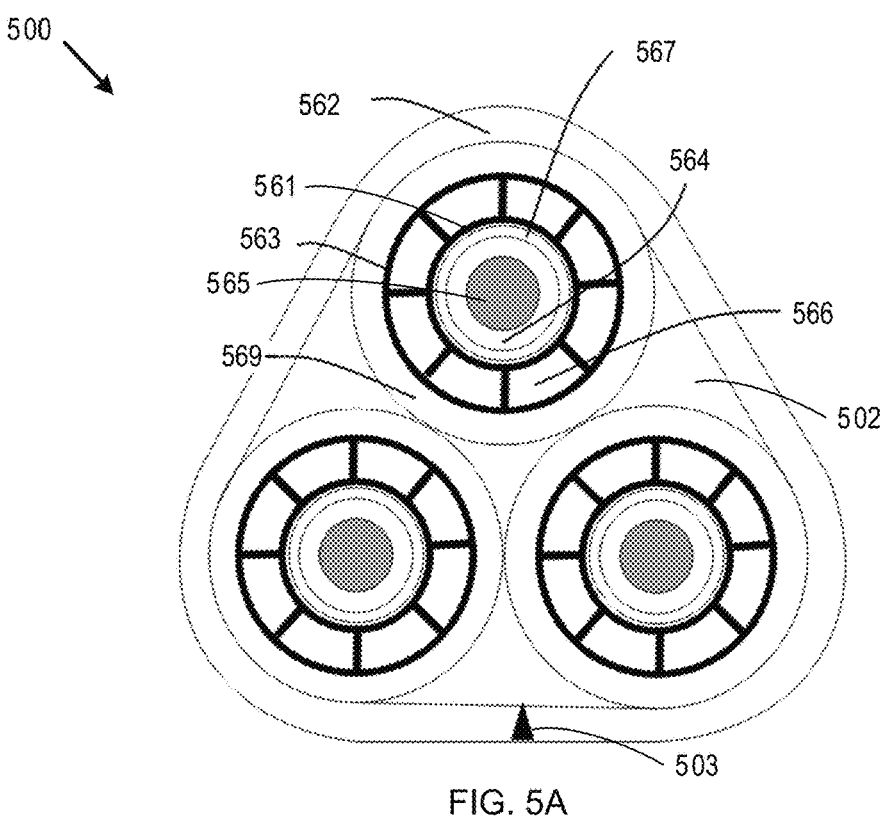
FIGS. 5A-5B are schematics of example superconducting cable structures, according to some implementations.
Figure 5B:
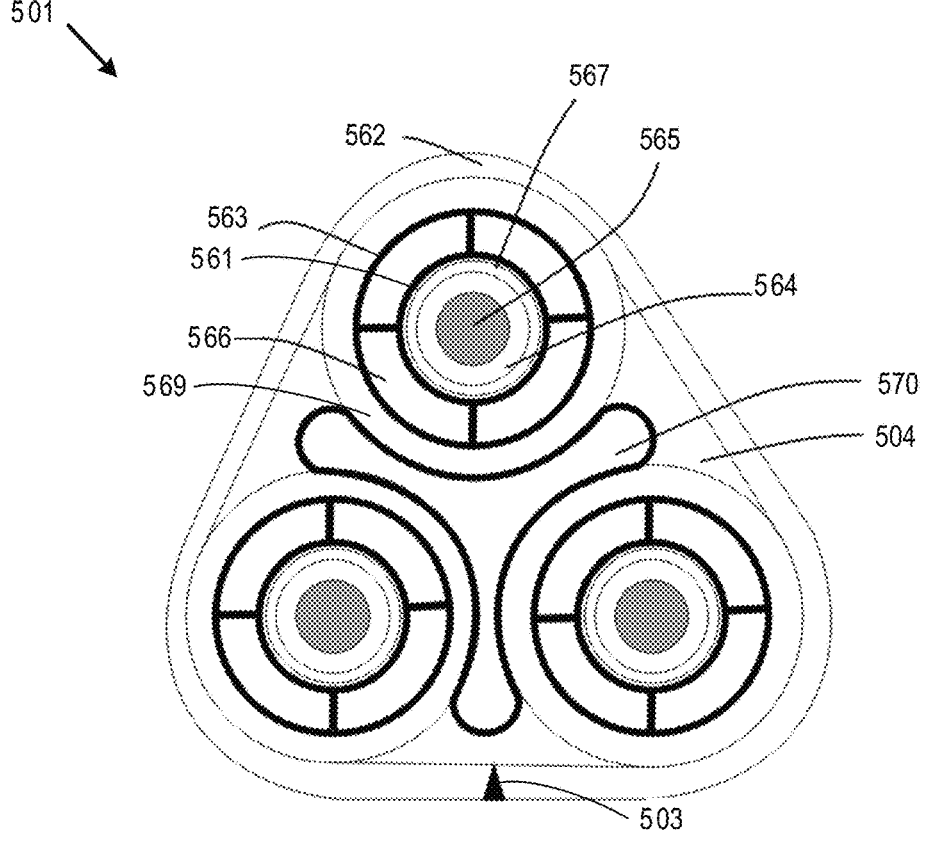

FIGS. 5A-5B are schematics of example superconducting cable structures, according to some implementations. In particular, FIG. 5A includes a cross-sectional view of a triangular superconducting cable structure 500 with three superconducting cables positioned in a triangular arrange-ment. The triangular superconducting cable structure 500 includes similar components as the superconducting cable structures described in FIGS. 2A-2B, FIGS. 3A-3B, and FIGS. 4A-4B. For example, the triangular superconducting cable structure 500 includes a triangular structure that con-sists of three quench conductors 565. Each quench conduc-tor 565 may be encased with an electrical insulator 564. Each of the electrical insulators 564 may be encased with a superconducting material 567. Each superconducting mate-rial 567 may be encased with an insulator 561. A cryogenic fluid supply channel 563 may encase the insulator 561. The cryogenic fluid supply channel 563 may include a honey-comb structure that may provide strength and/or to improve colling performance. In the implementation depicted in FIG.

5A the honeycomb structure of the cryogenic fluid supply channel 563 is depicted with 4 chambers, such as chamber 566. A thermal insulator 569 may encase the cryogenic fluid supply channel 563. The conducting cables may be wrapped in an armor 562. The armor 562 may be made by rolling and shaping a flat stainless sheet and welding the seam 503, where the seam 503 of the armor may be welded via welding methods such as laser welding. Areas between the conducting cables and the armor 562 (i.e., between the armor 462 and the thermal insulator 463) may act as a cryogenic fluid return channel 502, where the fluid may return to the surface.

FIG. 5B includes a cross-sectional view of a triangular superconducting cable structure 501 with three superconducting cables positioned in a triangular arrangement. The triangular superconducting cable structure 501 includes similar components as the superconducting cable structures described in FIGS. 2A-2B, FIGS. 3A-3B, and FIGS. 4A-4B. For example, the triangular superconducting cable structure 501 includes a triangular structure that consists of three quench conductors 565. Each quench conductor 565 may be encased with an electrical insulator 564. Each of the electrical insulators 564 may be encased with a superconducting material 567. Each superconducting material 567 may be encased with an insulator 561. A cryogenic fluid supply channel 563 may encase the insulator 561. The cryogenic fluid supply channel 563 may include a honeycomb structure that may provide strength and/or to improve colling performance. In the implementation depicted in FIG. 5B, the honeycomb structure of the cryogenic fluid supply channel 563 is depicted with 4 chambers, such as chamber 566. A thermal insulator 569 may encase the cryogenic fluid supply channel 563. The conducting cables may be wrapped in an armor 562. The armor 562 may be made by rolling and shaping a flat stainless sheet and welding the seam 503, where the seam 503 of the armor may be welded via welding methods such as laser welding. In the implementation depicted in FIG. 5B, a tube 570 may be positioned in the area between the armor 562 and the superconducting cables (i.e., between the armor 562 and the thermal insulator 569). The tube 570 may act as the cryogenic fluid return channels (such as cryogenic fluid return channels 302 of FIG. 3A or tubes 303 of FIG. 3B). The tube 570 may be configured with materials such as stainless steel. In some implementations, the tube 570 may be shaped to locate the superconducting cables (i.e., create a triangular shape with the superconducting cables). The tube 570 may be embedded in a thermal insulator 504 that may occupy the area between the armor 562 and the thermal insulator 569 and tube 570. The use of the thermal insulator 504 may ensure efficient cooling and return of the cryogenic fluid through the cryogenic fluid supply channels and cryogenic fluid return channels, respectively, and also provide mechanical strength for the tube 570 and superconducting cables within the armor 562.

Figure 6A:
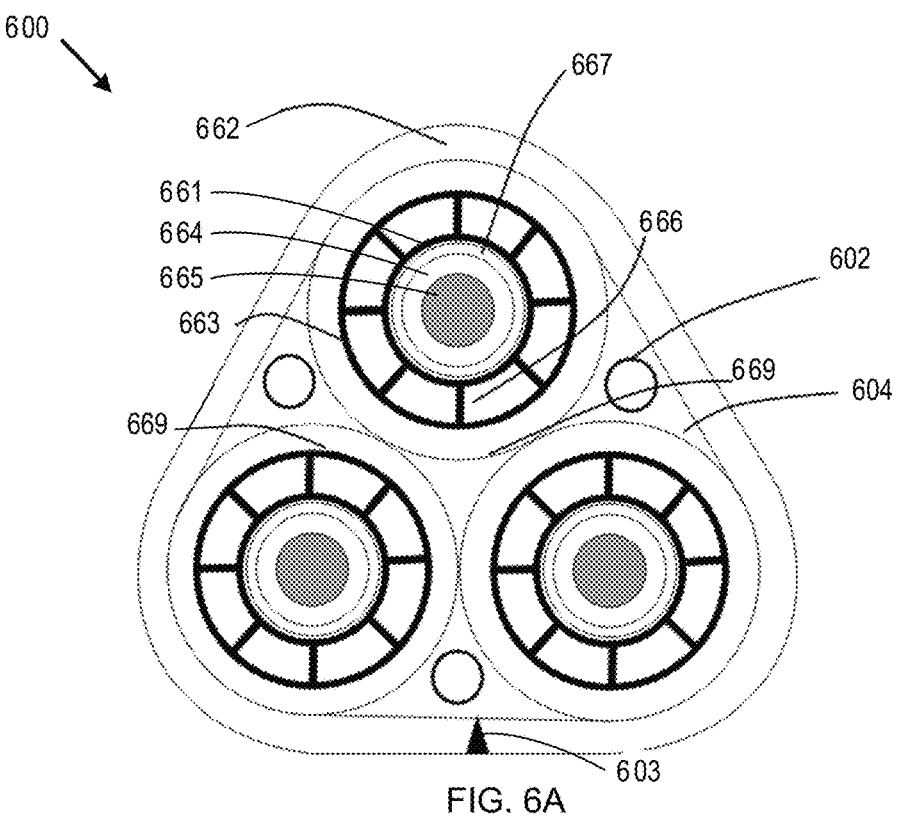
FIGS. 6A-6B are schematics of example superconducting cable structures, according to some implementations.
Figure 6B:
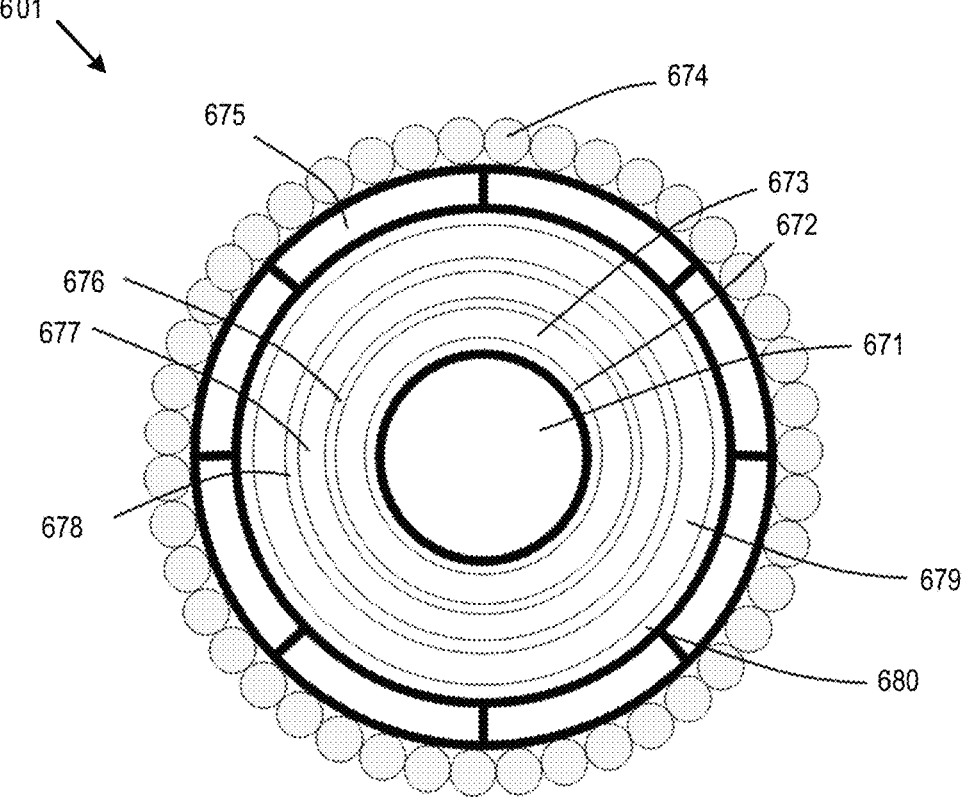

FIGS. 6A-6B are schematics of example superconducting cable structures, according to some implementations. In particular, FIG. 6A includes a cross-sectional view of a triangular superconducting cable structure 600 with three superconducting cables positioned in a triangular arrangement. The triangular superconducting cable structure 501 includes similar components as the superconducting cable structures described in FIGS. 2A-2B, FIGS. 3A-3B, FIGS. 4A-4B, and FIGS. 5A-5B. For example, the triangular superconducting cable structure 600 includes a triangular structure that consists of three quench conductors 665. Each quench conductor 665 may be encased with an electrical insulator 664. Each of the electrical insulators 664 may be encased with a superconducting material 667. Each superconducting material 667 may be encased with an insulator 661. A cryogenic fluid supply channel 563 may encase the insulator 561. The cryogenic fluid supply channel 563 may include a honeycomb structure that may provide strength and/or to improve colling performance. In the implementation depicted in FIG. 6A, the honeycomb structure of the cryogenic fluid supply channel 563 is depicted with 8 chambers, such as chamber 666. A thermal insulator 669 may encase the cryogenic fluid supply channel 465. The conducting cables may be wrapped in an armor 662. The armor 662 may be made by rolling and shaping a flat stainless sheet and welding the seam 603, where the seam 603 of the armor may be welded via welding methods such as laser welding. In the implementation depicted in FIG. 6A, one or more tubes 602 may be positioned in the area between the armor 662 and the superconducting cables (i.e., between the armor 662 and the thermal insulator 669). The tubes 602 may act as the cryogenic fluid return channels (such as the tubes 303 of FIG. 3B). The tubes 602 may be configured with materials such as stainless steel. The tubes 602 may be embedded in a thermal insulator 604 that may occupy the area between the armor 662 and the thermal insulator 669 and tubes 602. The use of the thermal insulator 604 may ensure efficient cooling and return of the cryogenic fluid through the cryogenic fluid supply channels 663 and cryogenic fluid return channels, respectively and also provide mechanical strength for the tubes 602 and superconducting cables within the armor 662.

FIG. 6B includes a cross-sectional view of a coaxial superconducting cable structure 601. The coaxial superconducting cable structure 601 may include concentric layers of superconducting material 673, 677, and 679. A cryogenic fluid supply channel 671 may be at the center of the coaxial superconducting cable structure 601, with the concentric layers of superconducting material 673, 677, and 679 encasing the cryogenic fluid supply channel 671. An electrical insulating material 672 may be positioned between the cryogenic fluid supply channel 671 and the superconducting material 673. An electrical insulating material 676 may be positioned between the superconducting material 673 and the superconducting material 677. An electrical insulating material 678 may be positioned between the superconducting material 677 and the superconducting material 679. An electrical insulating material 680 may encase the superconducting material 679. A cryogenic fluid return channel 675 may encase the electrical insulating material 680 and be concentric to the layers of superconducting material 673, 677, and 679. In some implementations, the cryogenic fluid return channel 675 may include a honeycomb structure that may provide strength and/or to improve colling performance. The honeycomb structure of the cryogenic fluid return channel 675 is depicted with 8 chambers. In some implementations, the cryogenic fluid return channel 675 may be positioned at the center of the coaxial superconducting cable structure 601 and the cryogenic fluid supply channel 671 may be on the outer diameter of the coaxial superconducting cable structure 601. The coaxial superconducting cable structure 601 may be supported by an armor. The armor may be configured with high strength steel wires, such as wire 674, or any other suitable wire material. In some implementations, the armor may comprise stainless steel tubing. In some implementations, there may be more than one armor layer. In some implementations, each of the armor layers may be wrapped in the same or opposite directions.

Figure 7:
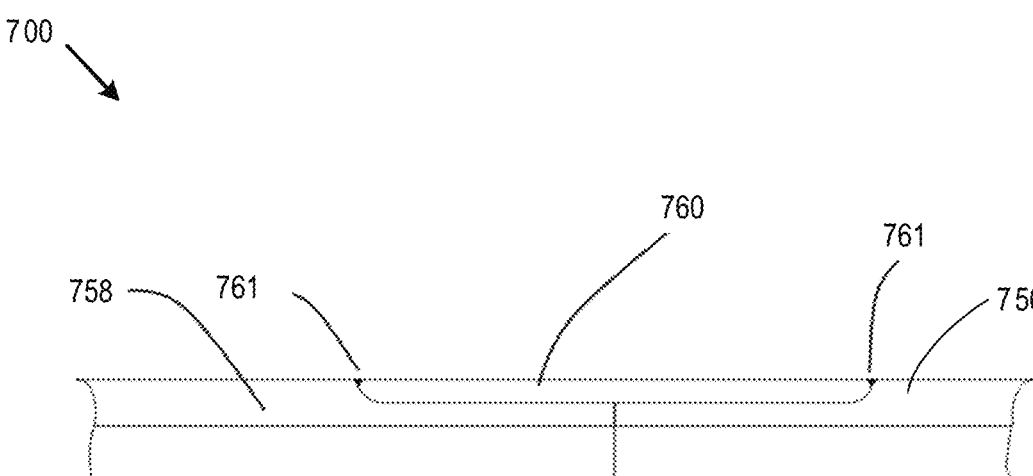
FIG. 7 is a schematic of an example splicing of superconducting cable structures, according to some implementations.

FIG. 7 is a schematic of an example splicing of superconducting cable structures, according to some implementations. In particular, FIG. 7 includes a spliced superconducting cable 700 that includes superconducting cable structures 756, 758. The ends of two or more superconducting cable structures 758, 756 may be spliced together. In some implementations, a splice joint 760 may be utilized to splice the superconducting cable structures 756, 758 and configured to withstand pressure such that there is no hydraulic communication between the internal components of the superconducting cable structures 756, 758 and the environment external to the superconducting cable structures 756, 758. The superconducting cable structures 756, 758 may be spliced utilizing any suitable method such as a weld, slip joint, a metal-to-metal seal, etc. In some implementations, one or more of the internal components of the superconducting cable structures 756, 758 may be pressured such that the internal pressure of the superconducting cable structures 756, 758 is approximately hydraulically balanced with the external environment of the superconducting cable structures 756, 758. In the implementation depicted in FIG. 7, an area of a superconducting cable structure 758 and an area of another superconducting cable structure 756 may be shaped to receive a splice joint 760. In some implementations, once in place in the areas on the superconducting cable structures 756, 758, the splice joint 760 may be welded proximate the ends 761 of the superconducting cable structures 756, 758 to be spliced. In some implementations, the superconducting cable structures 756, 758 may be internally spliced to protect the superconducting material from direct contact with cryogenic fluid.

Example Operations

Example operations for powering a downhole tool via one or more superconducting cables are now described in reference to FIG. 1, FIGS. 2A-2B, FIGS. 3A-3B, FIGS. 4A-4B, FIGS. 5A-5B, and FIGS. 6A-6B.

FIG. 8 is a flowchart of example operations for supplying power to a downhole tool via one or more superconducting cables, according to some implementations. FIG. 8 depicts a flowchart 800 of operations to supply a fluid to reduce the temperature of a superconducting material in a cable structure, and operations to return the fluid to the surface. The operations of flowchart 800 are described in reference to the ESP cable 140 of FIG. 1 and superconducting cable structures described in FIGS. 2A-2B, FIGS. 3A-3B, FIGS. 4A-4B, FIGS. 5A-5B, and FIGS. 6A-6B.

At block 802, fluid may be supplied to a cryogenic liquid supply channel within a cable structure to reduce a temperature of superconducting material, wherein the cable structure is configured to supply power to a downhole tool in a wellbore formed in a subsurface formation via the superconducting material.

At block 804 the fluid may return to the surface via one or more cryogenic fluid return channels.

While the aspects of the disclosure are described with reference to various implementations and exploitations, it will be understood that these aspects are illustrative and that the scope of the claims is not limited to them. In general, techniques for inducing vibrations in an impulse turbine as described herein may be implemented with facilities consistent with any hardware system or hardware systems. Many variations, modifications, additions, and improvements are possible.

Unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of the well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, some operations may be omitted and/or other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described should not be understood as requiring such separation in all implementations, and the described program components and systems may generally be integrated together in a single software product or packaged into multiple software products. Additionally, other implementations are within the scope of the following claims. In some cases, the actions recited in the claims may be performed in a different order and still achieve desirable results.

EXAMPLE IMPLEMENTATIONS

Implementation #1: A cable structure for use in a wellbore formed in a subsurface formation, the cable structure comprising: superconducting material configured to provide power to a downhole tool in the wellbore; a cryogenic liquid supply channel configured to supply fluid to reduce temperature of the superconducting material; and one or more cryogenic liquid return channels.

Implementation #2: The cable structure of Implementation #1, wherein the downhole tool includes an electric submersible pump, drill motors, drill heads, and electronic measuring tools.

Implementation #3: The cable structure of Implementation #1 or #2 further comprising: one or more quench conductors; and a first insulator encasing the respective quench conductors, wherein the superconducting material encases the first insulator.

Implementation #4: The cable structure of Implementation #3 further comprising: a second insulator encasing the superconducting material, wherein the cryogenic liquid supply channel encases the second insulator.

Implementation #5: The cable structure of Implementation #4 further comprising: a third insulator encasing the cryogenic liquid supply channel.

Implementation #6: The cable structure of Implementation #5, wherein the one or more cryogenic liquid return channels include an area between the third insulator and an armor or one or more tubes embedded in a thermal insulator.

Implementation #7: The cable structure of any one or more of Implementation #1-6, wherein the cryogenic liquid supply channel includes one or more chambers.

Implementation #8: The cable structure of any one or more of Implementation #1-7, wherein a structure of the cable structure includes flat, triangular, and coaxial.

Implementation #9: The cable structure of any one or more of Implementation #1-8 further comprising: a splice joint configured to splice the cable structure with another cable structure.

Implementation #10: A system comprising: a downhole tool positioned in a wellbore formed in a subsurface formation; superconducting material configured to provide power to the downhole tool in the wellbore; a cryogenic liquid supply channel configured to supply fluid to reduce temperature of the superconducting material; and one or more cryogenic liquid return channels.

Implementation #11: The system of Implementation #10, wherein the downhole tool includes an electric submersible pump, drill motors, drill heads, and electronic measuring tools.

Implementation #12: The system of Implementation #10 or #11 further comprising: one or more quench conductors; and a first insulator encasing the respective quench conductors, wherein the superconducting material encases the first insulator.

Implementation #13: The system of Implementation #12 further comprising: a second insulator encasing the superconducting material, wherein the cryogenic liquid supply channel encases the second insulator.

Implementation #14: The system of Implementation #13 further comprising: a third insulator encasing the cryogenic liquid supply channel.

Implementation #15: The system of Implementation #14, wherein the one or more cryogenic liquid return channels include an area between the third insulator and an armor, or one or more tubes embedded in a thermal insulator.

Implementation #16: The system of any one or more of Implementation #10-15, wherein the fluid returns to surface via the one or more cryogenic liquid return channels or flows to a motor of an electrical submersible pump.

Implementation #17: A method comprising: supplying a fluid to a cryogenic liquid supply channel within a cable structure to reduce a temperature of superconducting material, wherein the cable structure is configured to supply power to a downhole tool in a wellbore formed in a subsurface formation via the superconducting material; and returning the fluid to surface via one or more cryogenic liquid return channels.

Implementation #18: The method of Implementation #17, wherein the downhole tool includes an electrical submersible pump.

Implementation #19: The method of Implementation #17 or #18, wherein the fluid includes liquid nitrogen or liquid helium.

Implementation #20: The method of any one or more of Implementation #17-19 wherein the cryogenic liquid supply channel includes one or more chambers.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. A cable structure for use in a wellbore formed in a subsurface formation, the cable structure comprising:
   superconducting material configured to provide power to a downhole tool in the wellbore;
   a cryogenic liquid supply channel configured to supply fluid to reduce temperature of the superconducting material, wherein the cryogenic liquid supply channel includes two or more chambers; and
   one or more cryogenic liquid return channels.

2. The cable structure of claim 1, wherein the downhole tool includes an electric submersible pump, drill motors, drill heads, and electronic measuring tools.

3. The cable structure of claim 1 further comprising:
   one or more quench conductors; and
   a first insulator encasing the respective quench conductors, wherein the superconducting material encases the first insulator.

4. The cable structure of claim 3 further comprising:
   a second insulator encasing the superconducting material, wherein the cryogenic liquid supply channel encases the second insulator.

5. The cable structure of claim 4 further comprising:
   a third insulator encasing the cryogenic liquid supply channel.

6. The cable structure of claim 5, wherein the one or more cryogenic liquid return channels include an area between the third insulator and an armor or one or more tubes embedded in a thermal insulator.

7. The cable structure of claim 1, wherein a structure of the cable structure includes flat, triangular, and coaxial.

8. The cable structure of claim 1 further comprising:
a splice joint configured to splice the cable structure with another cable structure.

9. A system comprising:
a downhole tool positioned in a wellbore formed in a subsurface formation;
superconducting material configured to provide power to the downhole tool in the wellbore;
a cryogenic liquid supply channel configured to supply fluid to reduce temperature of the superconducting material, wherein the cryogenic liquid supply channel includes two or more chambers; and
one or more cryogenic liquid return channels.

10. The system of claim 9, wherein the downhole tool includes an electric submersible pump, drill motors, drill heads, and electronic measuring tools.

11. The system of claim 9 further comprising:
one or more quench conductors; and
a first insulator encasing the respective quench conductors, wherein the superconducting material encases the first insulator.

12. The system of claim 11 further comprising:
a second insulator encasing the superconducting material, wherein the cryogenic liquid supply channel encases the second insulator.

13. The system of claim 12 further comprising:
a third insulator encasing the cryogenic liquid supply channel.

14. The system of claim 13, wherein the one or more cryogenic liquid return channels include an area between the third insulator and an armor, or one or more tubes embedded in a thermal insulator.

15. The system of claim 9, wherein the fluid returns to surface via the one or more cryogenic liquid return channels or flows to a motor of an electrical submersible pump.

16. A method comprising:
supplying a fluid to a cryogenic liquid supply channel comprising two or more channels and positioned within a cable structure to reduce a temperature of superconducting material, wherein the cable structure is configured to supply power to a downhole tool in a wellbore formed in a subsurface formation via the superconducting material; and
returning the fluid to surface via one or more cryogenic liquid return channels.

17. The method of claim 16, wherein the downhole tool includes an electrical submersible pump.

18. The method of claim 16, wherein the fluid includes liquid nitrogen or liquid helium.

* * * * *